(12) United States Patent
Csik et al.

(10) Patent No.: US 7,051,780 B2
(45) Date of Patent: May 30, 2006

(54) LATCH ASSEMBLY FOR A BIFOLD COCKPIT DOOR

(75) Inventors: Stephen C. Csik, Monrovia, CA (US); James R. Hernandez, Pomona, CA (US)

(73) Assignee: Skylock Industries, Inc., Monrovia, CA (US)

( * ) Notice: Subject to any disclaimer, the term of this patent is extended or adjusted under 35 U.S.C. 154(b) by 333 days.

(21) Appl. No.: 10/397,916

(22) Filed: Mar. 26, 2003

(65) Prior Publication Data

US 2003/0184097 A1 Oct. 2, 2003

Related U.S. Application Data

(60) Provisional application No. 60/369,098, filed on Mar. 29, 2002.

(51) Int. Cl.
*E05D 15/26* (2006.01)
(52) U.S. Cl. .......................... 160/206; 70/218; 70/472; 70/379 R; 16/413; 16/422
(58) Field of Classification Search ................ 160/206, 160/199; 16/422, 412, 413; 70/472, 218, 70/379 R, DIG. 65; 244/118.5, 129.5; 292/34, 292/37, 164, 170, 140
See application file for complete search history.

(56) References Cited

U.S. PATENT DOCUMENTS

| | | | | | |
|---|---|---|---|---|---|
| 1,125,791 | A | * | 1/1915 | Aston | 70/134 |
| 2,237,289 | A | * | 4/1941 | Buck et al. | 16/422 |
| 2,969,666 | A | * | 1/1961 | Muessel | 70/116 |
| 3,390,557 | A | * | 7/1968 | Erickson et al. | 70/97 |
| 4,459,835 | A | * | 7/1984 | Hurskainen | 70/486 |
| 5,096,237 | A | * | 3/1992 | Hotzl | 292/34 |
| 5,435,372 | A | * | 7/1995 | Kikuchi | 160/206 |
| 5,524,941 | A | * | 6/1996 | Fleming | 292/34 |
| 6,834,520 | B1 | * | 12/2004 | LaConte et al. | 70/472 |

* cited by examiner

*Primary Examiner*—David Purol
(74) *Attorney, Agent, or Firm*—Christie, Parker & Hale, LLP

(57) ABSTRACT

A latch assembly is provided having a deadbolt rod assembly, and a first lock actuating means for moving the latch assembly between an unlocked position, wherein the deadbolt rod assembly is in a retracted position and a locked position, wherein the deadbolt rod assembly is in an extended position. The latch assembly further includes a second lock actuating means for moving the latch assembly between the unlocked position, the locked position, and a lockout position wherein the deadbolt rod assembly is extended but cannot be retracted by the first lock actuating means.

20 Claims, 11 Drawing Sheets

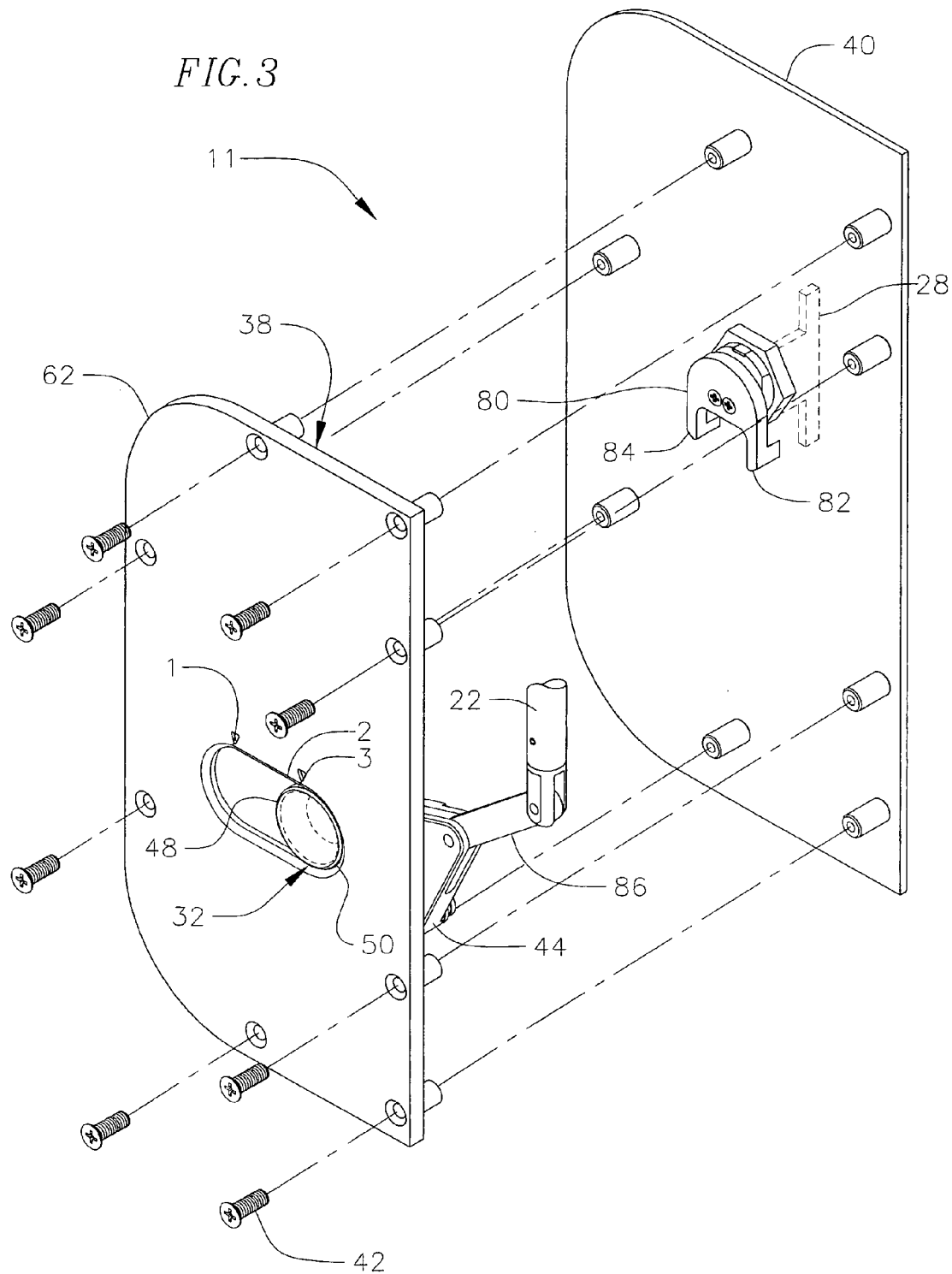

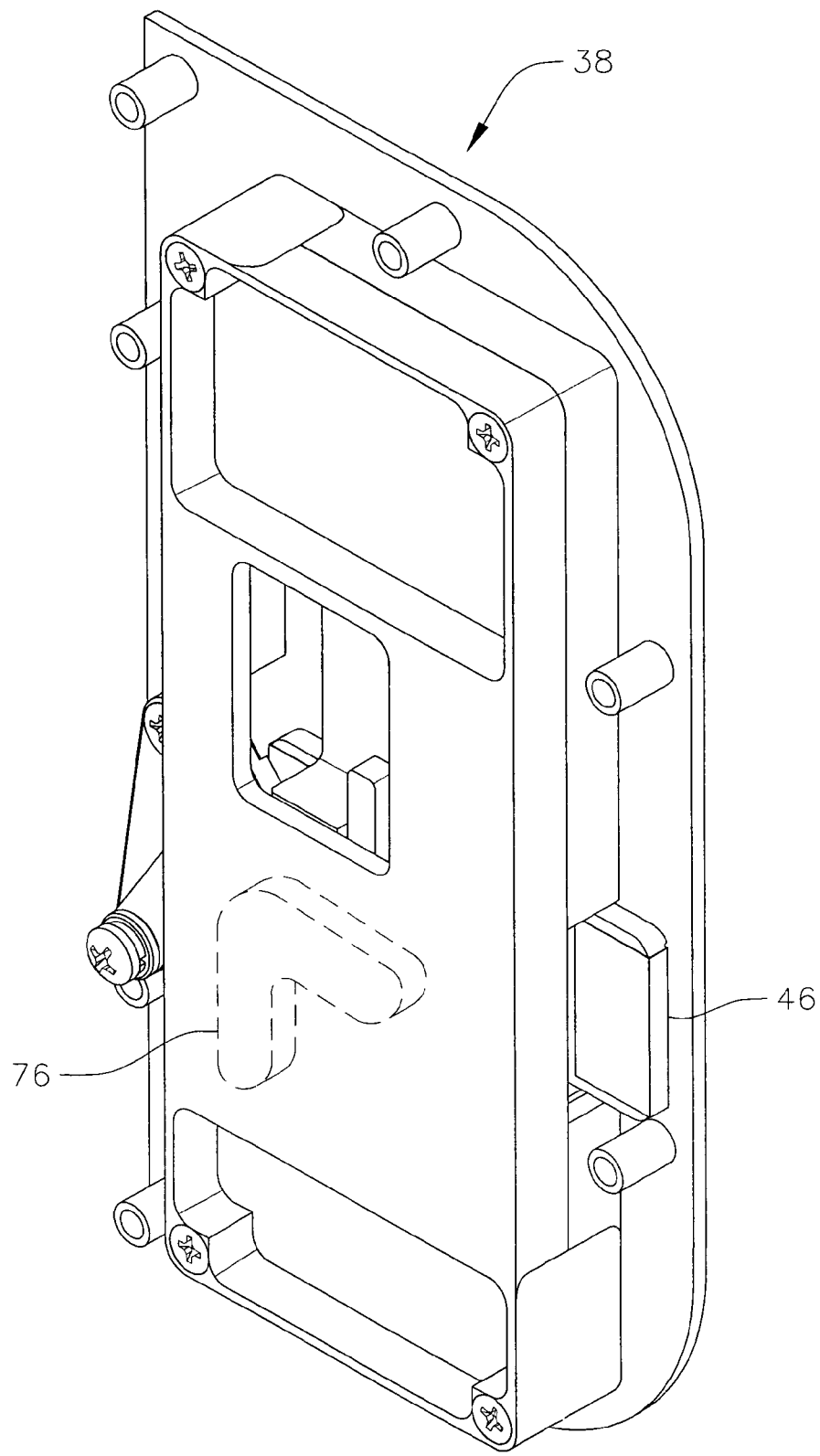

LATCH ASSEMBLY FOR A BIFOLD COCKPIT DOOR

CROSS REFERENCE TO RELATED APPLICATION(S)

This application claims priority under 35 U.S.C. §119(e) to U.S. Provisional Application Serial No. 60/369,098, filed on Mar. 29, 2002.

FIELD OF THE INVENTION

The present invention relates generally to a latch assembly for a bifold door and more particularly to latch assembly for a bifold door having a deadbolt rod assembly and a first lock actuating means on a first side of the door for moving the latch assembly between an unlocked position, wherein the deadbolt rod assembly is in a retracted position and a locked position, wherein the deadbolt rod assembly is in an extended position. The latch assembly further includes a second lock actuating means on a second side of the door for moving the latch assembly between the locked position, the unlocked position, and a lockout position wherein the deadbolt rod assembly is in the extended position and the first lock actuating means is inoperable.

BACKGROUND

Due to recent terrorist attacks on airplanes in the United States, security measures in the airline industry have become a top priority. For instance, past terrorist attacks have included terrorists overtaking the flight crew and assuming control of the airplane. Accordingly, a need exists for an improved latch assembly for attachment to a airplane cockpit bifold door assembly that prevents unauthorized persons from entering the cockpit, thereby improving the security of the airplane.

SUMMARY

In one embodiment, the present invention includes a latch assembly having a deadbolt rod assembly and a first lock actuating means for moving the latch assembly between an unlocked position, wherein the deadbolt rod assembly is in a retracted position and a locked position, wherein the deadbolt rod assembly is in an extended position. The latch assembly further includes a second lock actuating means for moving the latch assembly between the unlocked position, the locked position, and a lockout position wherein the deadbolt rod assembly is extended but cannot be retracted by the first lock actuating means.

In another embodiment, the above described latch assembly is attached to a bifold door assembly.

BRIEF DESCRIPTION OF THE DRAWINGS

These and other features and advantages of the present invention will be better understood by reference to the following detailed description when considered in conjunction with the accompanying drawings wherein:

FIG. 3 is an exploded perspective view of a latch assembly of the bifold door assembly of FIG. 1A;

FIG. 5B is an assembled perspective view of the front assembly of FIG. 5A;

DETAILED DESCRIPTION OF EMBODIMENTS OF THE INVENTION

As shown in FIGS. 1A–8, an embodiment of the present invention is directed to a latch assembly for a bifold door having a deadbolt rod assembly and a first lock actuating means on a first side of the door for moving the latch assembly between an unlocked position, wherein the deadbolt rod assembly is in a retracted position and a locked position, wherein the deadbolt rod assembly is in an extended position. The latch assembly further includes a second lock actuating means on a second side of the door for moving the latch assembly between the locked position, the unlocked position and a lockout position, wherein the deadbolt rod assembly is in the extended position and the first lock actuating means is inoperable.

For example, in one embodiment, the latch assembly is attached to a bifold cockpit door, such that the first lock actuating means faces a cabin or passenger side of the door and the second lock actuating means faces a flightdeck or cockpit side of the door. This allows flight crew personnel or other persons within the cockpit to place the latch assembly in the lockout position, thus rendering the first lock actuating means inoperable, and preventing any person, such as a potential terrorist, from unlocking the door from the cabin or passenger side of the door, thereby improving the security of the airplane.

Figure 1A:
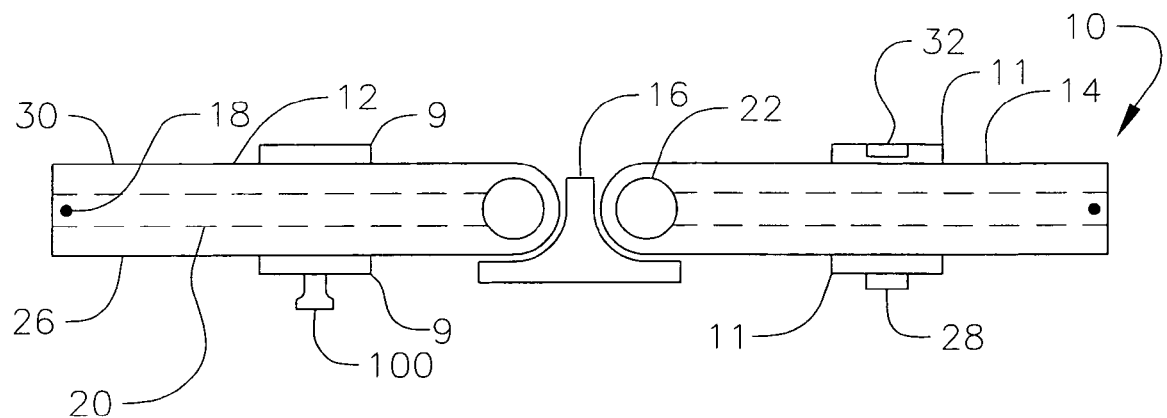
FIG. 1A is a top view of a bifold door assembly according to the present invention shown in a closed position.
Figure 1B:
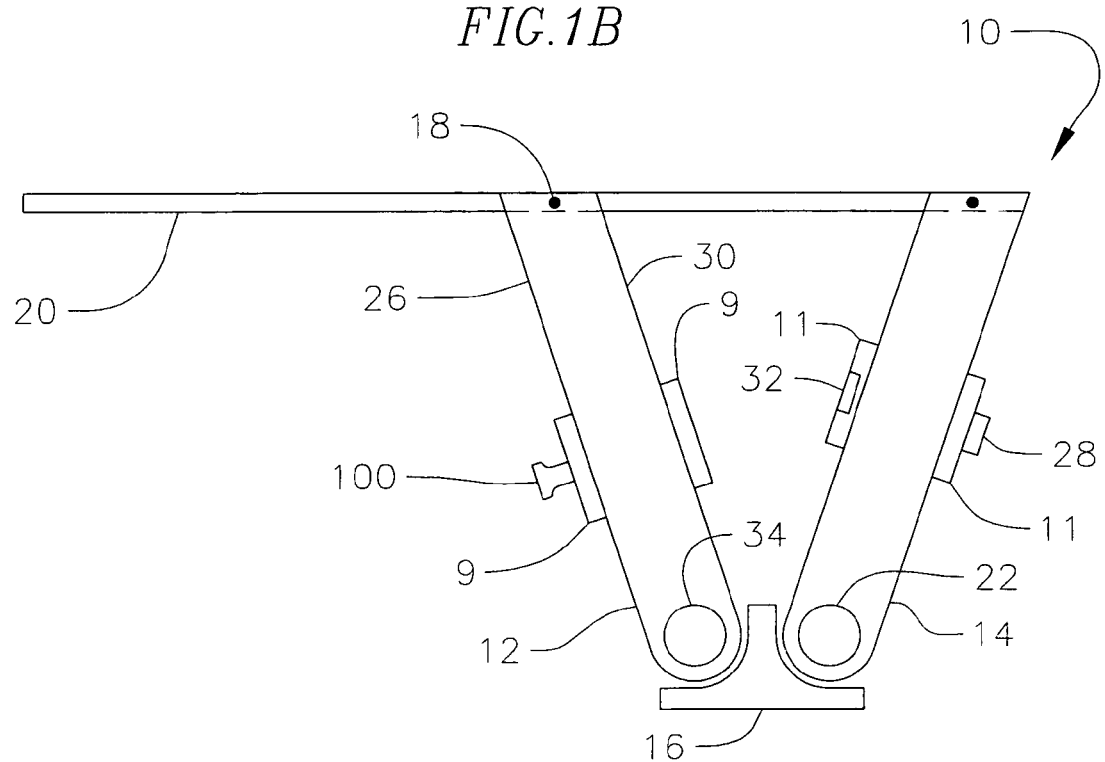
FIG. 1B is a top view of the bifold door assembly of FIG. 1A shown in an open position.

An exemplary bifold door assembly 10 is shown in FIGS. 1A–1B. In the depicted embodiment, the bifold door assembly 10 comprises a first door 12 and a second door 14 connected by a hinge 16. The first door 12 includes a pin 18 that rides along a rail 20 in a door jam (not shown) when the bifold door assembly 10 is moved between a closed position (FIG. 1A) and an open position (FIG. 1B).

Figure 2A:
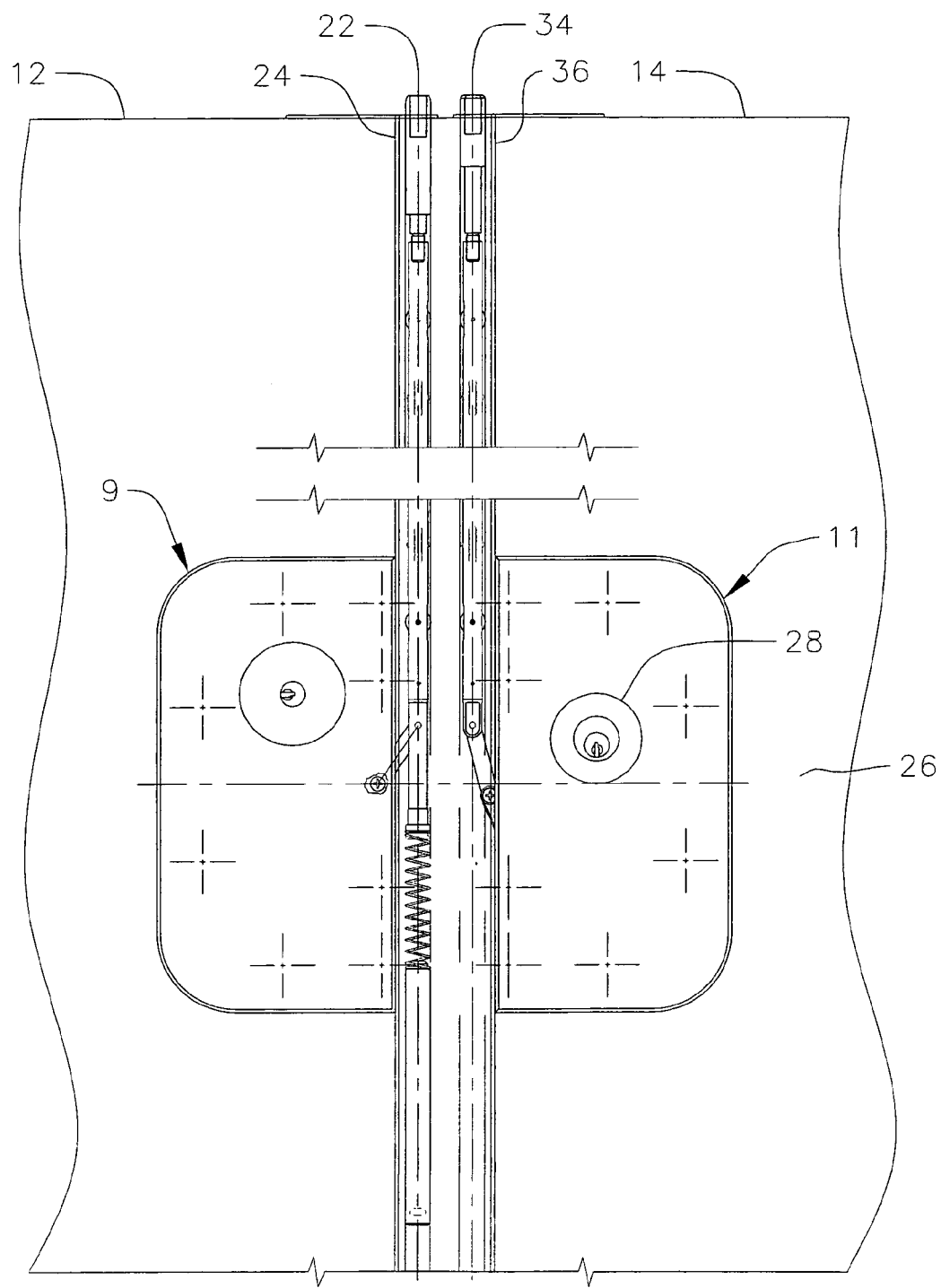
FIG. 2A is a front view of the bifold door assembly of FIG. 1A shown from a first side of the bifold door assembly.
Figure 2B:
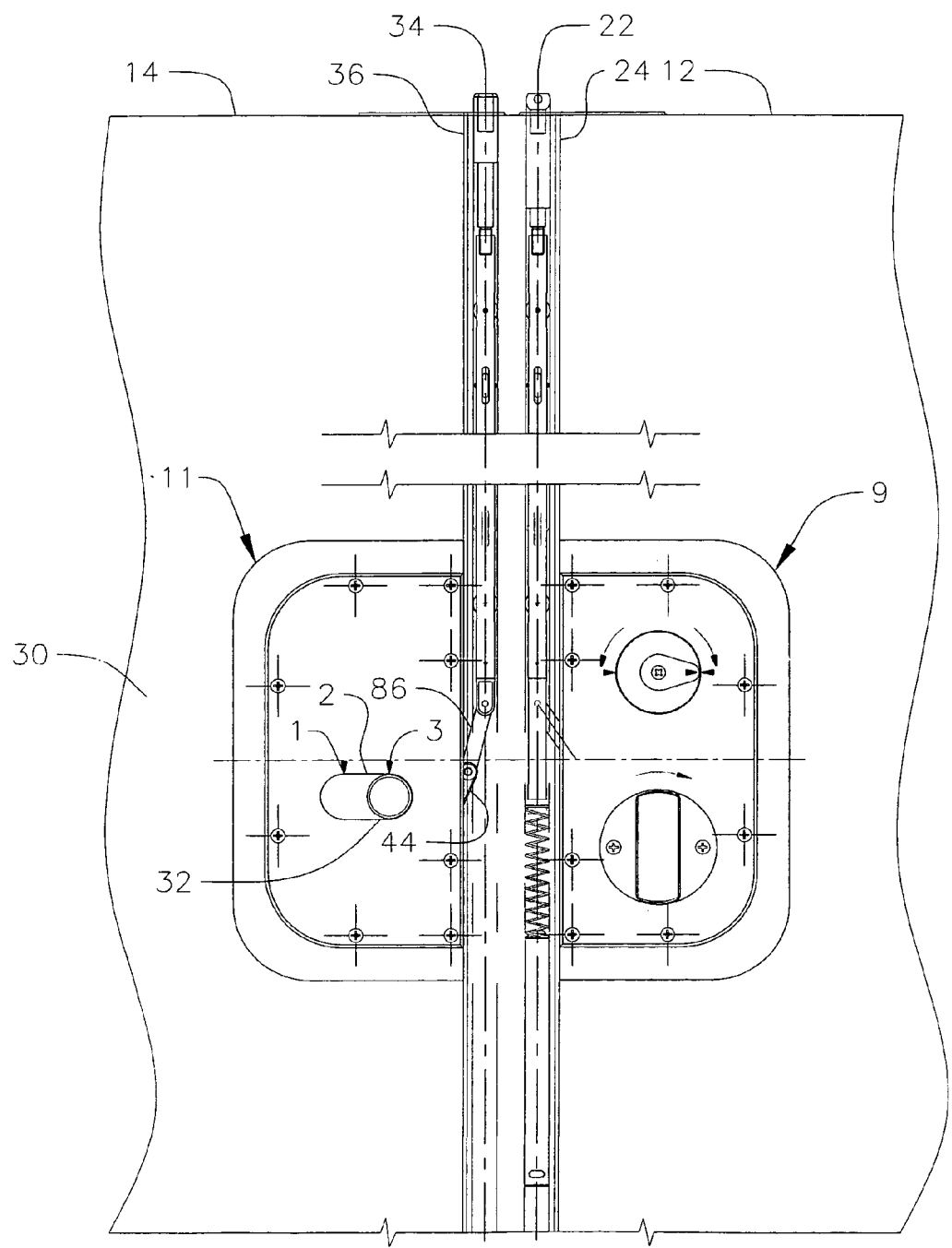
FIG. 2B is a front view of the bifold door assembly of FIG. 1A shown from a second side of the bifold door assembly.

As shown in FIGS. 2A–2B, the first door 12 has a deadbolt rod assembly 22 that rides along a guide tube 24 in the door 12 and is movable between a locked position, wherein the deadbolt rod assembly 22 protrudes from the door guide tube 24 and engages an opening in the door jam (not shown) and an unlocked position, wherein the deadbolt rod assembly 22 is disposed within the door guide tube 24 and does not engage the door jam. The deadbolt rod assembly 22 is movably connected to a mechanical deadbolt latch assembly 11 that has a first lock actuating means 28 on a first side of the mechanical deadbolt latch assembly 11 and a second lock actuating means 32 on a second side of the mechanical deadbolt latch assembly 11, such that from a cabin or passenger side 26 of the door 12 (as shown in FIG. 2A), the deadbolt rod assembly 22 is moveable by actuation of the first lock actuating means 28 and from a flightdeck or cockpit side 30 of the door 12 (as shown in FIG. 2B), the deadbolt rod assembly 22 is moveable by actuation of the second lock actuating means 32. As will be discussed in detail below, the first lock actuating means 28 may be used for moving the deadbolt rod assembly 22 between the unlocked position and the locked position and the second lock actuating means 32 may be used for moving the deadbolt rod assembly 22 between the unlocked position, the locked position and a lockout position, where the deadbolt rod assembly 22 is in the locked position and the first lock actuating means 28 is inoperable.

Similar to the first door 12, the second door 14 has a slam rod assembly 34 that rides along a guide tube 36 in the second door 14 and is movable between a locked position, wherein the slam rod assembly 34 protrudes from the door guide tube 36 and engages an opening in the door jam and an unlocked position, wherein the slam rod assembly 34 is disposed within the door guide tube 36 and does not engage the door jam. The slam rod assembly 34 is movably connected to an electronically controlled electronically interfacing slam latch assembly 9.

FIG. 3 shows an exemplary embodiment of the mechanical deadbolt latch assembly 11. The mechanical deadbolt latch assembly 11 has a front assembly 38 that comprises the second lock actuating means 32. The front assembly 38 is connected to an exterior mounting plate assembly 40, for example by a plurality of fasteners 42. The exterior mounting plate assembly 40 comprises the first lock actuating means 28 (as shown in FIG. 4).

Figure 5A:
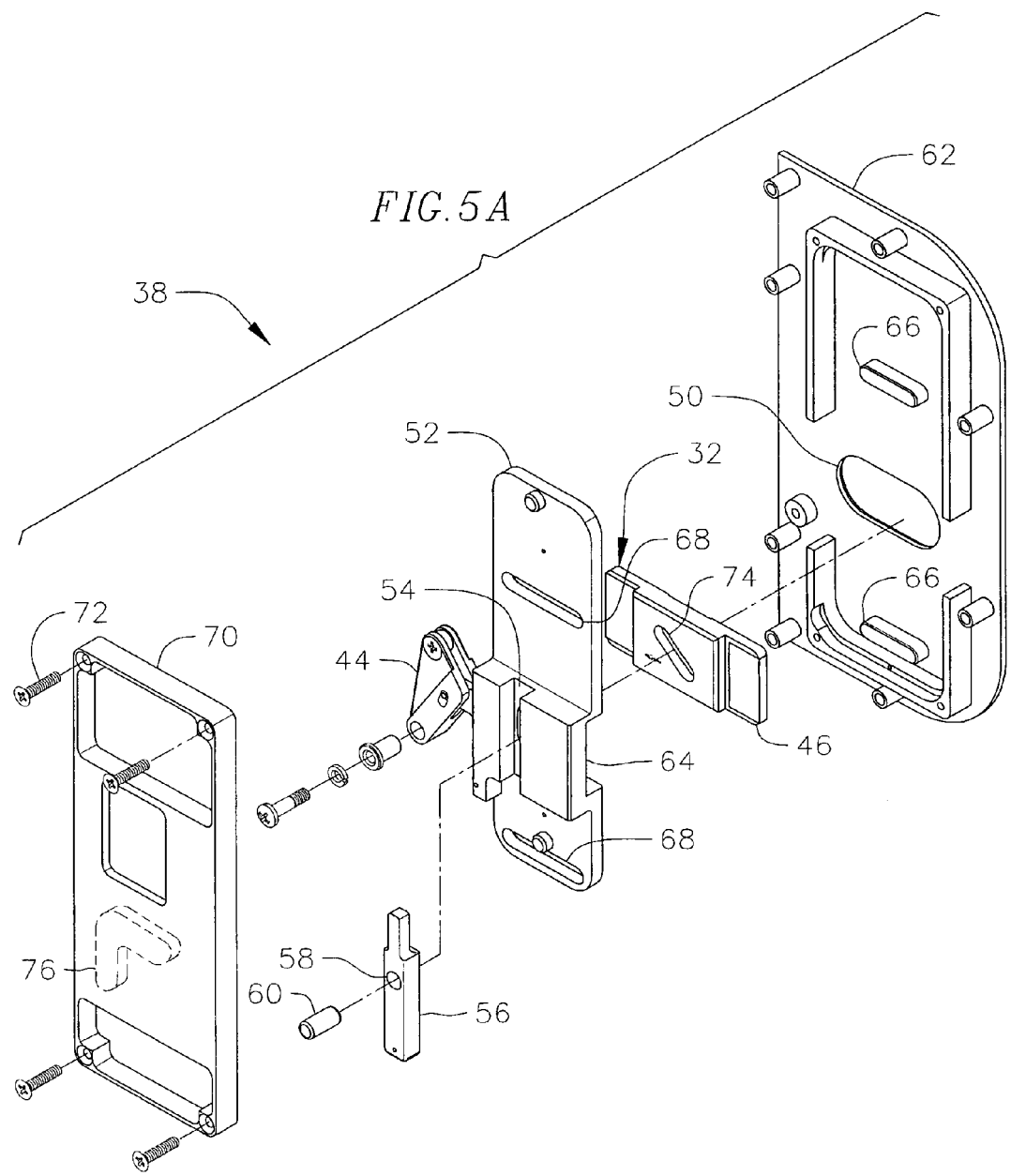
FIG. 5A is an exploded perspective view of a front assembly of the latch assembly of FIG. 3.

In one embodiment, the second lock actuating means 32 is a toggle plate 46 (as shown in FIG. 5A). As shown in the embodiment of FIG. 3, the toggle plate 46 has a knob 48 that extends through a slot 50 in an interior mounting plate assembly 62 of the front assembly 38 of the mechanical deadbolt latch assembly 11. In this embodiment, the toggle plate 46 may be moved to cause the deadbolt rod assembly 22 to move between the locked and the unlocked positions.

Figure 4:
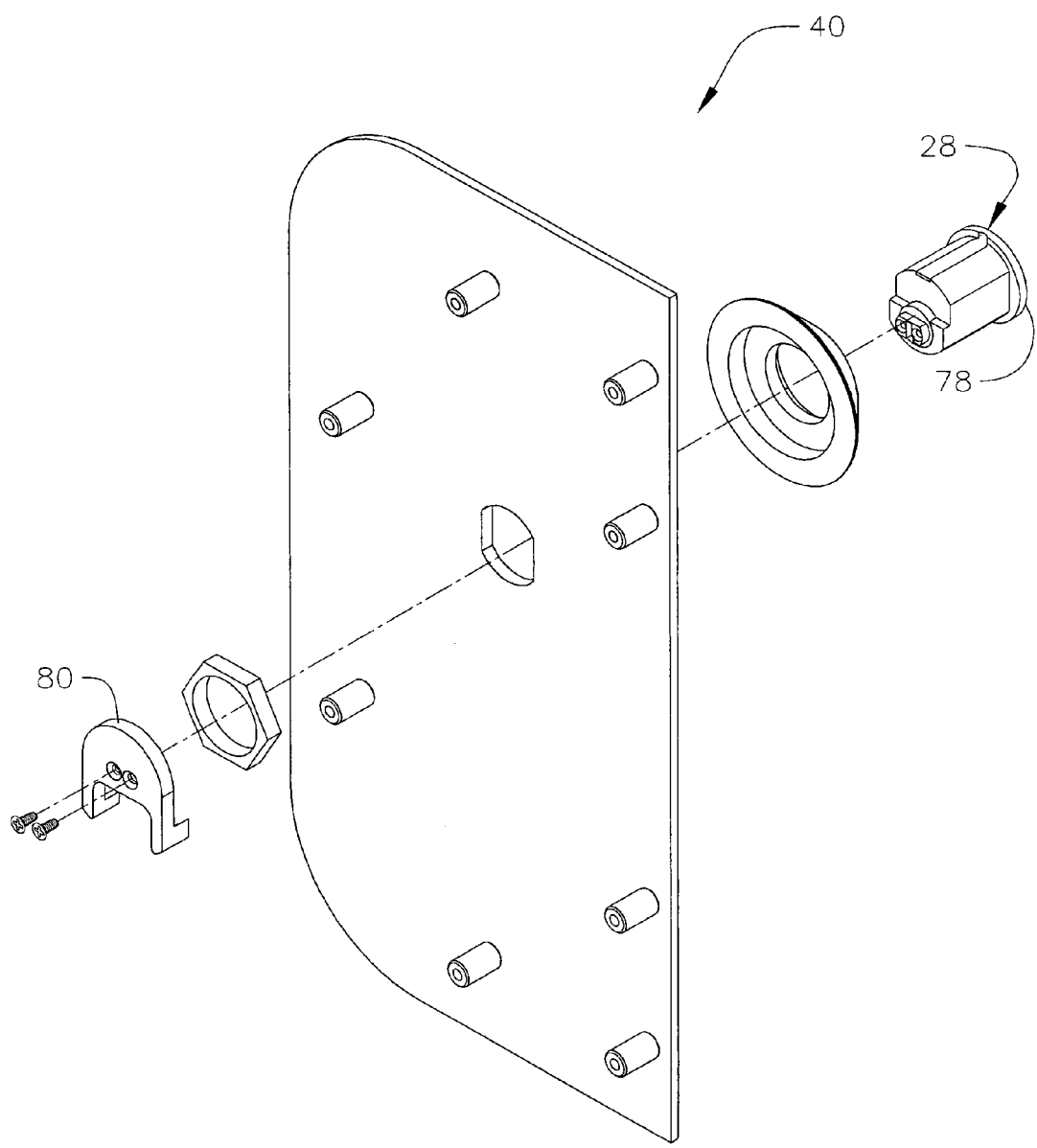
FIG. 4 is a back assembly of the latch assembly of FIG. 3.

In one embodiment, as shown in FIG. 4, the first lock actuating means 28 is a key cylinder 78. In this embodiment, the key cylinder 78 is attached to a lock cam 80, such that inserting and rotating a key (not shown) within the key cylinder 78, causes a corresponding rotation of the lock cam 80. As will be explained further below, rotation of the lock cam 80 causes the deadbolt rod assembly 22 to move between the locked and the unlocked positions.

FIG. 5A shows an exploded back view of the front assembly 38, which comprises the second lock actuating means 32. In this embodiment, the second lock actuating means 32 is the toggle plate 46. As shown, the front assembly 38 comprises the interior mounting plate assembly 62 having the slot 50 for receiving the knob 48 of the toggle plate 46. In one embodiment, the slot 50 is a lateral slot. A slide assembly 52 is positioned adjacent to the interior mounting plate assembly 62 and is moveable with respect to the interior mounting plate assembly 62. For example, the interior mounting plate assembly 62 may comprise one or more guiderails 66, such as lateral guiderails, that interface within a corresponding slot 68 in the slide assembly 52. In one embodiment, the slide assembly 52 is attached to the bell crank 44 and the bell crank 44 is attached to the deadbolt rod assembly 22 through a connecting link 86 (as shown in FIG. 3). The slide assembly 52 comprises a lateral channel 64 for receiving and connecting to the toggle plate 46.

For example, in one embodiment, the toggle plate 46 is connected to the slide assembly 52 by a slot and pin connection, such that when the mechanical deadbolt latch assembly 11 is moved between the unlocked and locked positions, as described below, the toggle plate 46 and the slide assembly 52 move as one unit, but when the exterior mounting plate assembly 40 is moved between the locked and lockout positions, as described below, the toggle plate 46 moves relative to the slide assembly 52.

In the above described arrangement, the mechanical deadbolt latch assembly 11 may be moved between the locked and unlocked positions by moving the toggle plate 46. Such a movement causes a corresponding movement of the slide assembly 52, the bell crank 44, the connecting link 86 and the deadbolt rod assembly 22. For example, in one embodiment, a lateral movement of the toggle plate 46 causes a corresponding lateral movement in the slide assembly 52 and the bell crank 44. The lateral movement of the bell crank 44 causes a corresponding movement of the connecting link 86, which causes the deadbolt rod assembly 22 to vertically move within the door guide tube 24.

Figure 5C:
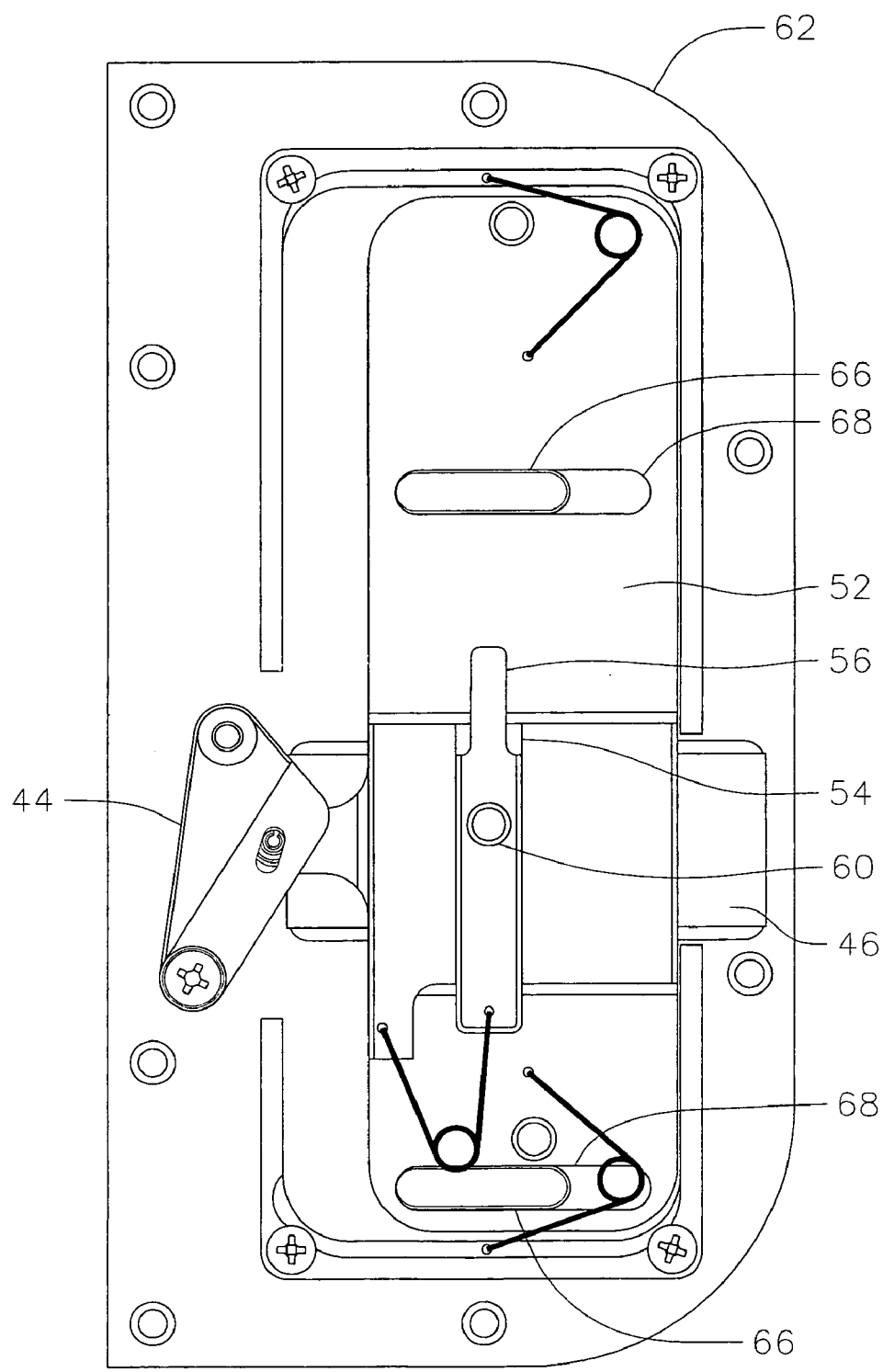
FIG. 5C is a front view of the front assembly of FIG. 5A, wherein a cover plate has been removed for clarity.

In this embodiment, the slide assembly 52 also comprises a channel 54, such as a vertical groove, for receiving a slide bolt 56, such that the slide bolt 56 is moveable within the slide assembly channel 54. The slide bolt 56 has an opening 58 for receiving an actuating pin 60. Alternatively, the slide bolt 56 and the actuating pin may form one integral part. The actuating pin 60 is engaged with each of: a groove 74 in the toggle plate 46, the opening 58 in the slide bolt 56 and a groove 76 on an inner surface of a cover plate 70, which is positioned adjacent to the slide assembly 52. In one embodiment, the toggle plate groove 74 is an angled groove and the cover plate groove 76 is an L-shaped groove. As shown in FIG. 5A, the cover plate 70 is also attached to the interior mounting plate assembly 62, for example by fasteners 72. An assembled view of the front assembly 38 of the mechanical deadbolt latch assembly 11 is shown in FIG. 5B. FIG. 5C is a front view of the front assembly 38, wherein the cover plate 70 has been removed for clarity.

The mechanical deadbolt latch assembly 11 may also be moved between the locked and unlocked positions by actuation of the first lock actuating means 28, such as the key cylinder 78. For example, referring back to FIG. 3, when the front assembly 38 is attached to the exterior mounting plate assembly 40 and the key cylinder 78 is rotated in a locking direction, a first arm 82 of the key cylinder lock cam 80 contacts the slide bolt 56 and causes a movement of the slide bolt 56, which causes a corresponding movement of the slide assembly 52. The movement of the slide assembly 52 causes corresponding movements of the bell crank 44, the connecting link 86 and the deadbolt rod assembly 22 as described above.

Similarly, when the key cylinder 78 is rotated in an unlocking direction, a second arm 84 of the key cylinder lock cam 80 contacts the slide bolt 56 and causes a movement of the slide bolt 56, which causes a corresponding movement of the slide assembly 52, the bell crank 44, the connecting link 86 and the deadbolt rod assembly 22 as described above.

As a result, the first lock actuating means 28, for example, the key cylinder 78, may be used to move the mechanical deadbolt latch assembly 11 between the locked position and unlocked positions. As will be described below, the second lock actuating means 32, for example, the toggle plate 46, may be used to move the mechanical deadbolt latch assembly 11 between the locked, the unlocked, and the lockout position, which renders the first lock actuating means 28 inoperable.

Figure 6A:
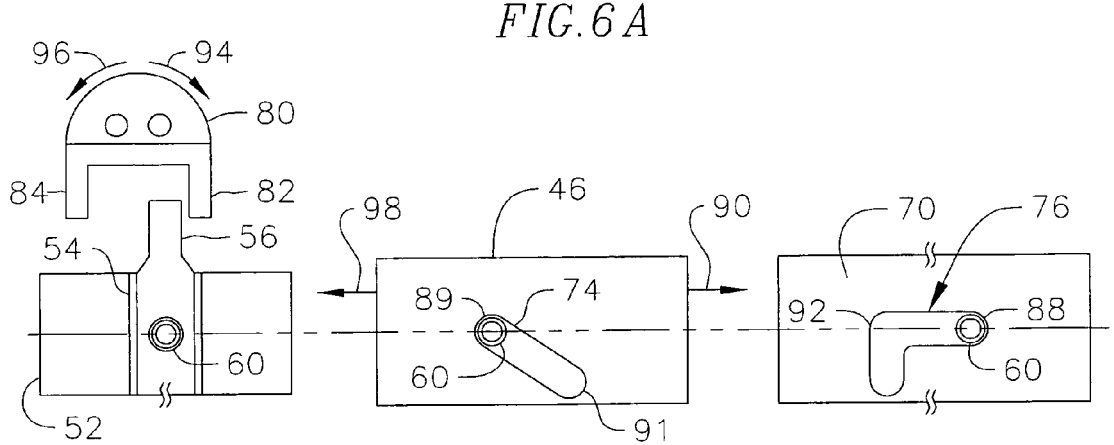
FIG. 6A is a schematic representation of the latch assembly of FIG. 3 shown in an unlocked position.
Figure 6B:
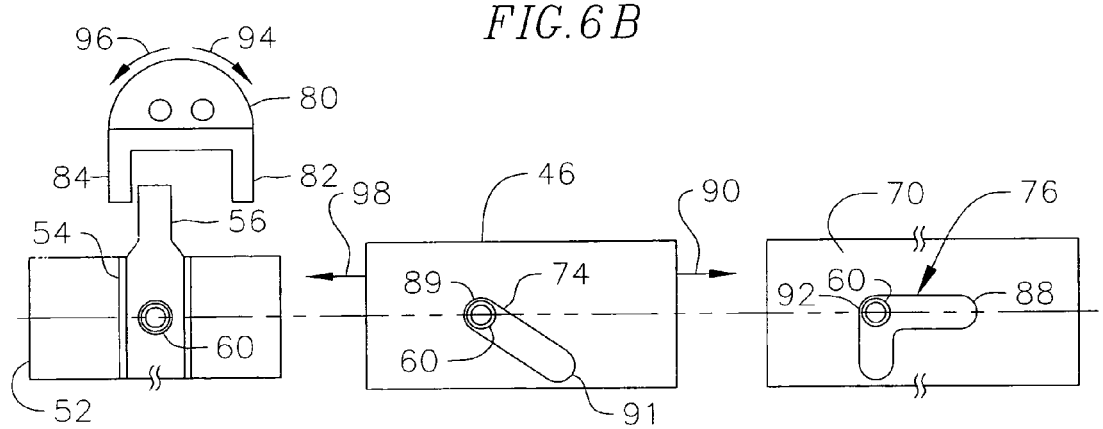
FIG. 6B is a schematic representation of the latch assembly of FIG. 3 shown in a locked position.
Figure 6C:
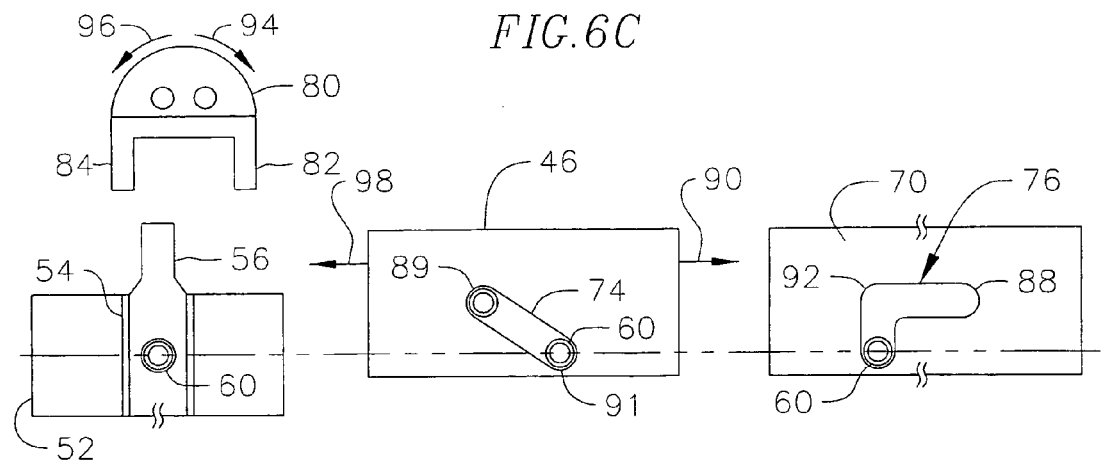
FIG. 6C is a schematic representation of the latch assembly of FIG. 3 shown in a lockout position.

FIGS. 6A–6C show a schematic representation of the mechanical deadbolt latch assembly 11. As previously discussed, the actuating pin 60 is engaged with each of the angled groove 74 in the toggle plate 46, the opening 58 in the slide bolt 56 and the L-shaped groove 76 in the cover plate 70. FIGS. 6A–6C show the relationship of the actuating pin 60 to each of these elements in the unlocked position (FIG. 6A), the locked position (FIG. 6B) and the lockout position (FIG. 6C).

FIG. 6A shows the mechanical deadbolt latch assembly 11 in the unlocked position, i.e. when the deadbolt rod assembly 22 is not engaged with the door jam. In the unlocked position, the actuating pin 60 is disposed adjacent to a first lateral sidewall 88 in the L-shaped groove 76 of the cover plate 70 and adjacent to an upper sidewall 89 in the angled groove 74 of the toggle plate 46. In the unlocked position, the actuating pin 60 is also positioned relative to the key cylinder lock cam 80 such that the slide bolt 56 is adjacent to the first arm 82 of the key cylinder lock cam 80.

FIG. 6B shows the mechanical deadbolt latch assembly 11 in the locked position, i.e. when the deadbolt rod assembly 22 is engaged with an opening in the door jam. The mechanical deadbolt latch assembly 11 may be moved from the unlocked position to the locked position by a movement of the toggle plate 46 in the locking direction as indicated by arrow 90. For example, in one embodiment the movement of the toggle plate 46 is a lateral movement. Such a movement of the toggle plate 46 causes a corresponding movement of the slide assembly 52, and a vertical movement of the deadbolt rod assembly 22, as described above. The movement of the slide assembly 52 also causes the slide bolt 56 to move from a position adjacent to the first arm 82 of the key cylinder lock cam 80 to a position adjacent to the second arm 84 of the key cylinder lock cam 80 and a lateral movement of the actuating pin 60 within the L-shaped groove 76 from the first lateral sidewall 88 to the second lateral sidewall 92.

The mechanical deadbolt latch assembly 11 may also be moved from the unlocked position to the locked position by inserting and rotating a key (not shown) within the key cylinder 78 in a locking direction as indicated by arrow 94. Such a movement, causes the first arm 82 to contact and laterally move the slide bolt 56. Movement of the slide bolt 56 causes a movement of the slide assembly 52 and therefore the deadbolt rod assembly 22 as described above. Movement of the slide bolt 56 also causes a lateral movement of the actuating pin 60 within the L-shaped groove 76 of the cover plate 70 from the first lateral sidewall 88 to the second lateral sidewall 92.

When the mechanical deadbolt latch assembly 11 is in the locked position (FIG. 6B), the mechanical deadbolt latch assembly 11 may be moved to the unlocked position, either by rotating the key cylinder 78 in the unlocking direction indicated by arrow 96 or moving the toggle plate 46 in the unlocking direction indicated by arrow 98. During these movements, the corresponding movements of the mechanical deadbolt latch assembly 11 components will be the opposite of that described above for the movement of the mechanical deadbolt latch assembly 11 from the unlocked position to the locked position.

FIG. 6C shows the mechanical deadbolt latch assembly 11 in the lockout position, i.e. when the deadbolt rod assembly 22 is engaged with an opening in the door jam in such a way that the deadbolt rod assembly 22 may be disengaged by actuation of the second lock actuating means 32, for example the toggle plate 46, but may not be disengaged by actuation of the first lock actuating means 28, for example the key cylinder 78. The mechanical deadbolt latch assembly 11 may only be moved from the locked position to the lockout position by a movement of the second lock actuating means 32. For example, in one embodiment, when the mechanical deadbolt latch assembly 11 is in the locked position, the actuating pin 60 is positioned adjacent to the second lateral sidewall 92 of the L-shaped groove 76 of the cover plate 70. Thus, when the toggle plate 46 is moved in the locking direction, indicated by arrow 90, the second lateral sidewall 92 of the L-shaped groove 76 of the cover plate 70 prevents a lateral movement of the actuating pin 60 and therefore prevents a lateral movement of the slide assembly 52 and the slide bolt 56, and thus the deadbolt rod assembly 22 remains engaged with the opening in the door jam. However, in this embodiment, the toggle plate 46 is only connected to the slide assembly 52 through the actuating pin 60. Thus, although the slide assembly 52 remains in the same lateral position, movement of the toggle plate 46 in the locking direction 90 causes the actuating pin 60 to move within the angled groove 74 of the toggle plate 46 from the upper sidewall 89 to a lower sidewall 91. This movement causes the actuating pin 60, and thus the slide bolt 56, to move vertically downward within the slide assembly channel 54. As a result, in the lockout position, the slide bolt 56 is moved away from the key cylinder lock cam 80, such that when the key cylinder lock cam 80 is rotated, in either direction 94 or 96, the arms 82 and 84 of the key cylinder lock cam 80 do not contact the slide bolt 56 and thus actuation of the key cylinder 78 does not effect a movement of the deadbolt rod assembly 22, i.e. the key cylinder 78 is inoperable.

The mechanical deadbolt latch assembly 11 may be moved from the lockout position to the locked position by moving the toggle plate 46 in the unlocking direction 98. In such a movement, the corresponding movements of the mechanical deadbolt latch assembly 11 components will be the opposite of that described above for the movement of the mechanical deadbolt latch assembly 11 from the locked position to the lockout position.

In one embodiment, the mechanical deadbolt latch assembly 11 comprises visual indicators that indicate the position of the second lock actuating means 32. For example, in an embodiment where the second lock actuating means 32 is the toggle plate 46, the cover plate 70 comprises visual indicators 1, 2 and 3 which show where to move the toggle plate 46 to move the mechanical deadbolt latch assembly 11 into each of the unlocked position, the locked position and the lockout position. For instance, in one embodiment the visual indicator 1 comprises an arrow and the word unlock, the visual indicator 2 comprises an arrow and the word lock, and the visual indicator 3 comprises an arrow and the word lockout. In other embodiments, the visual indicators may comprise color codes or pictural codes for indicating the unlocked, locked and lockout positions.

Referring back to FIGS. 1A–1B, when both the electronically interfacing slam latch assembly 9 and the mechanical deadbolt latch assembly 11 are in the unlocked position, the bifold door assembly 10 may be moved between the open (FIG. 1A) and closed (FIG. 1B) positions. From the flightdeck or cockpit side 30 of the bifold door assembly 10, the assembly 10 may be opened by pushing the assembly 10 in the direction of the cabin or passenger side 26 of the assembly 10. This causes the door pin 18 to ride within the door rail 20 and thus the assembly 10 to open. From the cabin or passenger side 26 of the assembly 10, the assembly may be opened by pulling a handle 100, such as a door knob, that is attached to the assembly 10. For example, the handle 100 may be attached to the electronically interfacing slam latch assembly 9 (as depicted in FIGS. 1A–1B), to the mechanical deadbolt latch assembly 11, or to either of the doors 12 or 14.

However, a concern exists that even if the electronically interfacing slam latch assembly 9 and the mechanical deadbolt latch assembly 11 are each in the locked position, the bifold door assembly 10 could be opened from the cabin or passenger side 26 of the assembly 10 by attaching a rope or a belt around the handle 100 and pulling the rope or belt in a direction away from the bifold door assembly 10. Such an action might disengage the rod assemblies 34 and 22 from the door jam or buckle the bifold door assembly 10 to an extent that access to the flightdeck or cockpit side 30 of the assembly 10 is facilitated.

As such, the handle 100 is designed to disengage from the bifold door assembly 10 when a tensile force (i.e. a force tending to pull the handle 100 away from the bifold door assembly 10) that would otherwise cause damage to door structure or latch is applied to the handle 100. For example, in one embodiment the handle 100 is designed to disengage from the bifold door assembly 10 when a tensile force in the range of approximately 250 to approximately 800 pounds is applied to the handle 100.

Figure 7A:
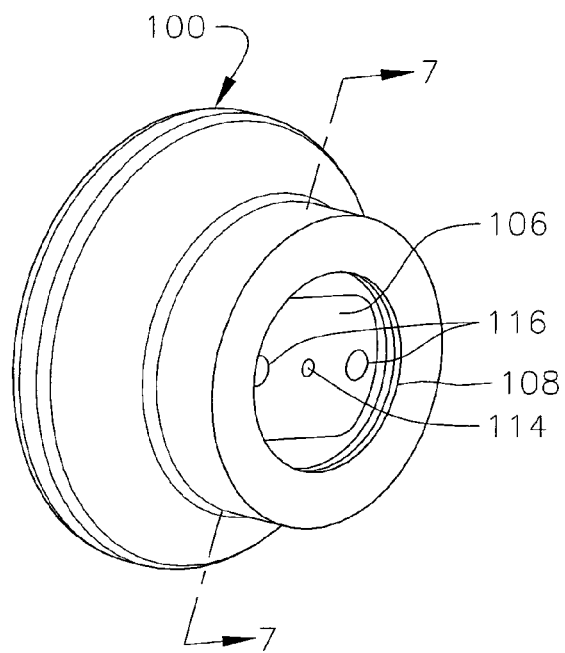
FIG. 7A is a perspective view of a handle for attachment to the bifold door assembly of FIG. 3.
Figure 7B:
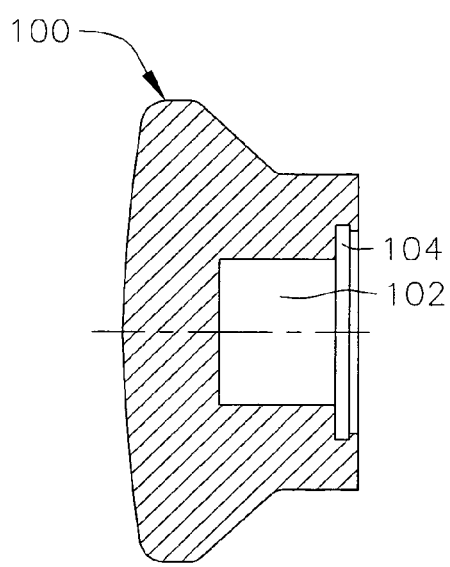
FIG. 7B is a cross-sectional view of the handle of FIG. 7A, taken from line 7—7 of FIG. 7A.
Figure 7C:
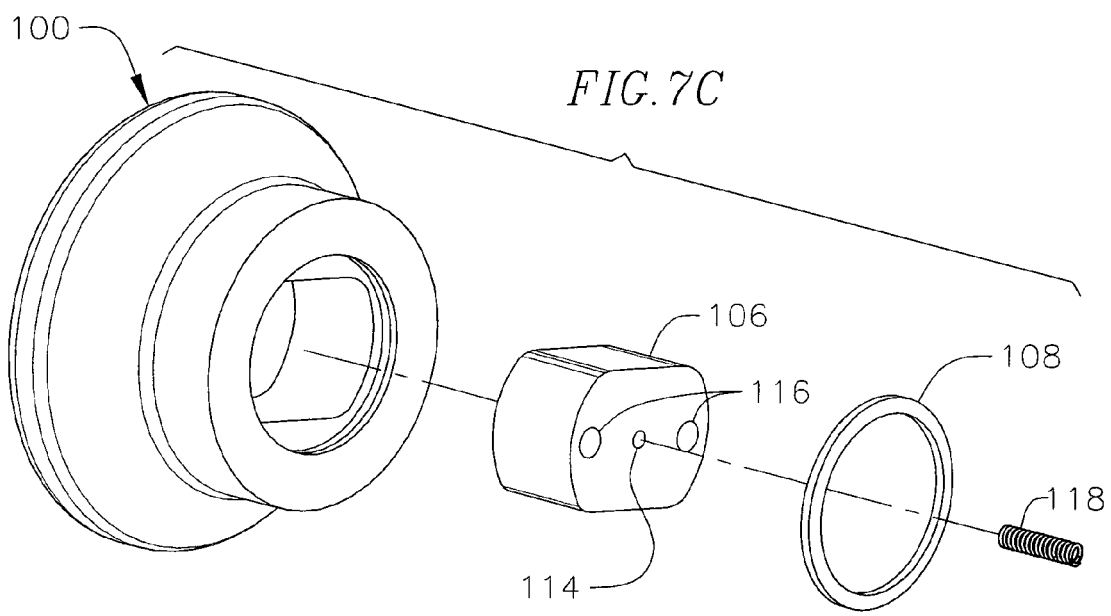
FIG. 7C is an exploded perspective view of the handle of FIG. 7A.

FIGS. 7A–7C show one embodiment of the handle 100. In the depicted embodiment, the handle 100 comprises an inner opening 102 having a shoulder 104. A block 106 fits within the opening 102 and is retained therein by one or more retaining rings 108, such as a snap ring, that fit within the handle shoulder 104.

Figure 8:
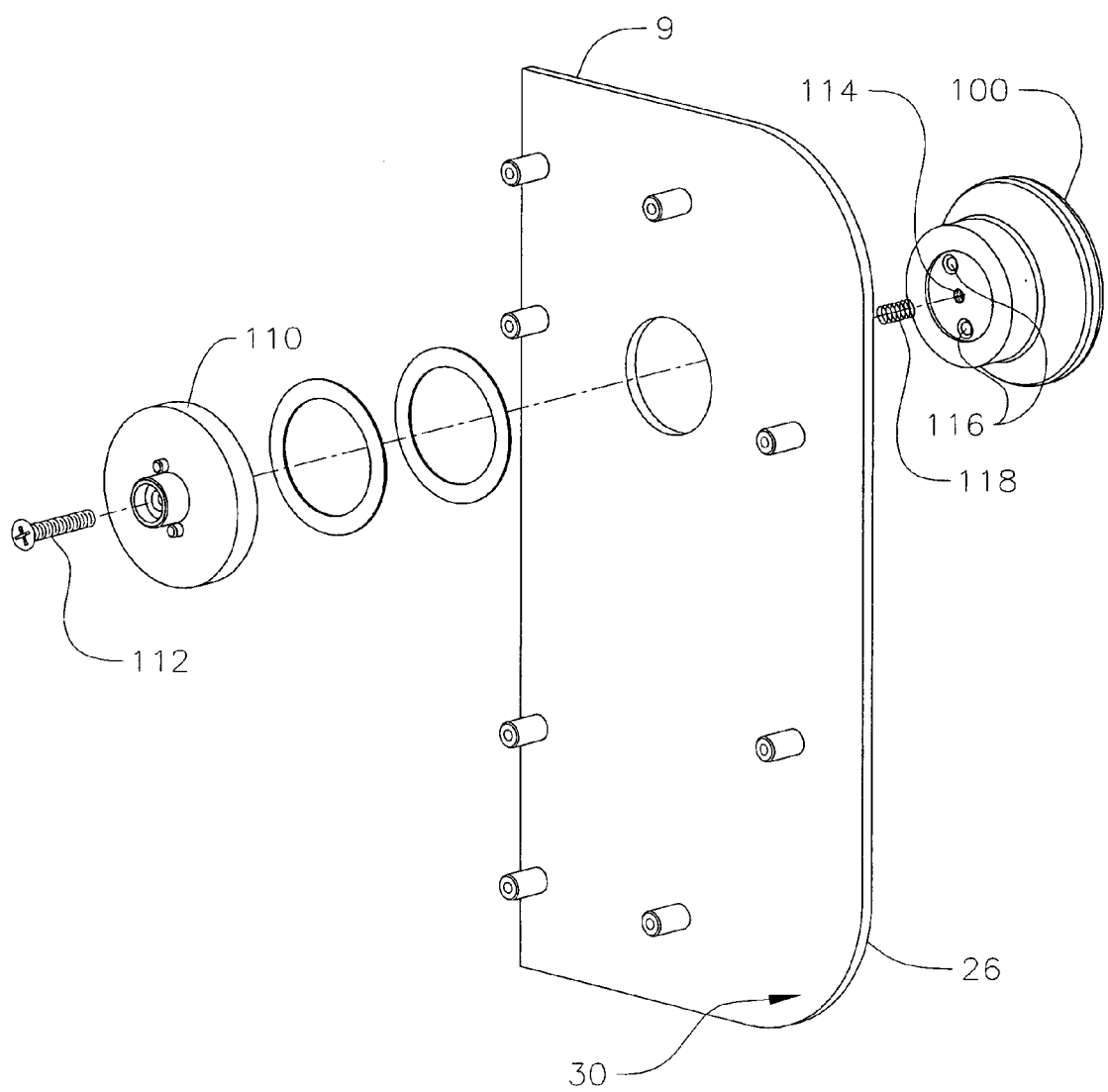
FIG. 8 is an exploded perspective view of the handle of FIG. 7, and a mounting spud for attaching the handle to the bifold door assembly.
Figure 1A:
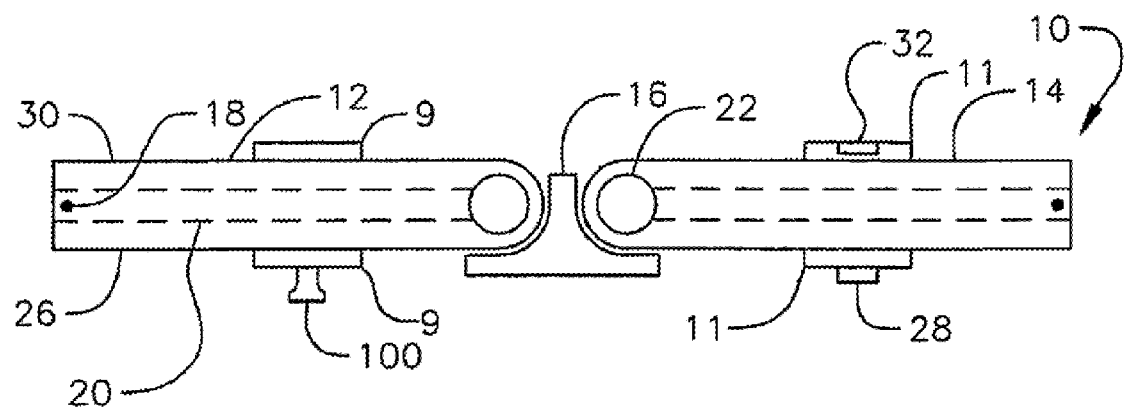
Figure 1B:
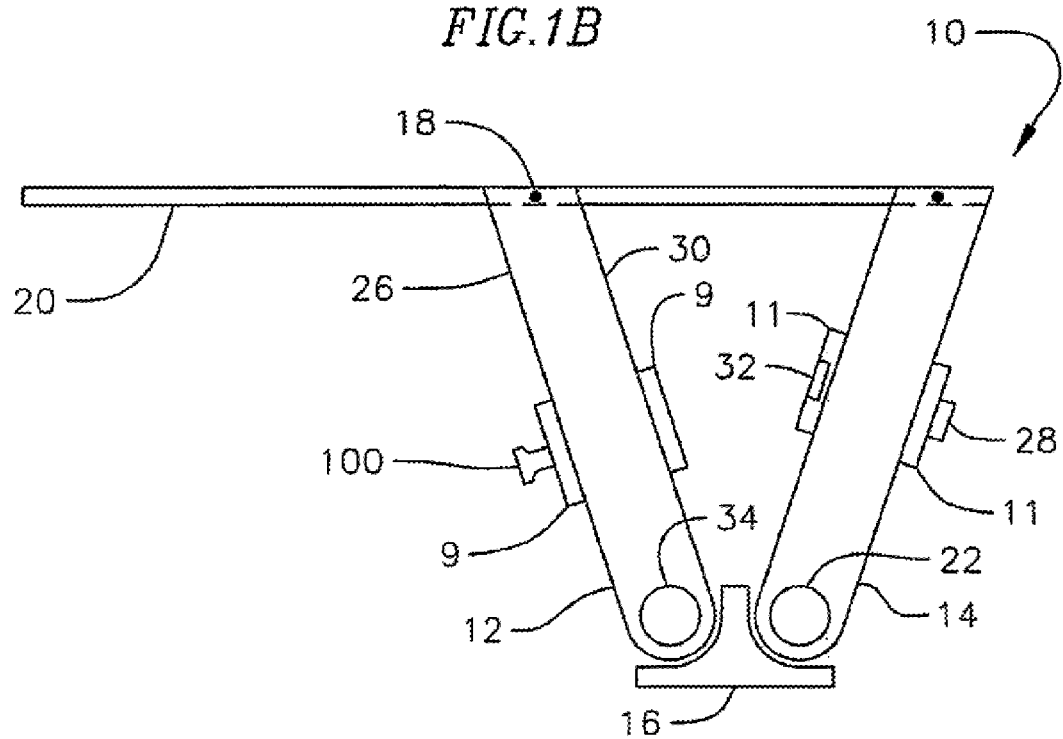
Figure 8:
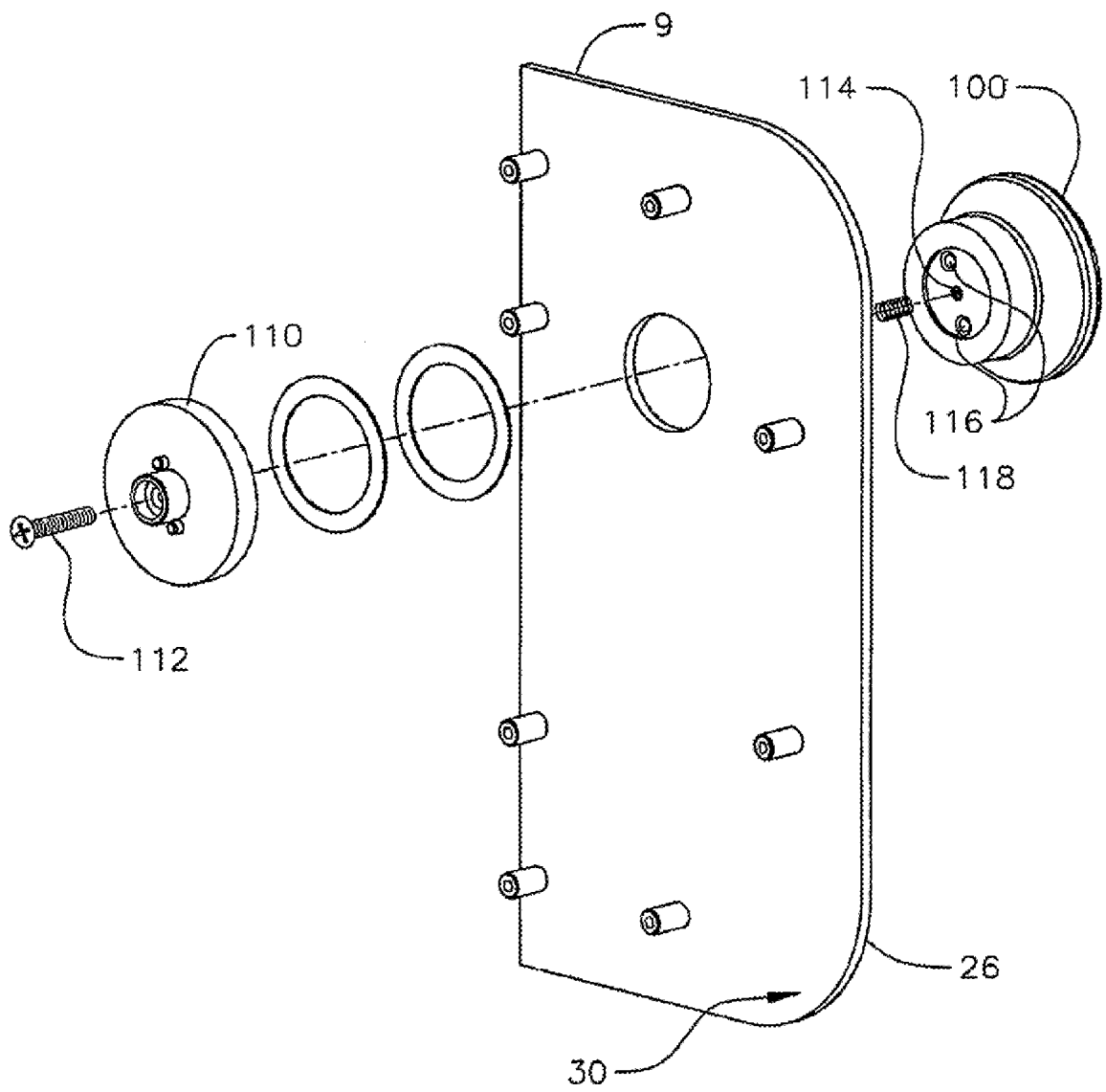

As shown in FIG. 8, in one embodiment the handle 100 is disposed on the cabin or passenger side 26 of the bifold door assembly 10, and is attached to a mounting spud 110 that is disposed on the flightdeck or cockpit side 30 of the bifold door assembly 10 by a fastener 112, such as a screw fastener, that threadably engages an internally threaded opening 114 in the block 106. In one embodiment, the handle 100 may include a helicoil 118 that threadably engages the threaded opening 114 in the block 106 and receives the threads of the fastener 112 to also form a threaded engagement with the fastener 112. Although not shown, the mounting spud 110 may also comprise one or more pins that engage, such as by a press fit connection, a corresponding opening 116 in the block 106.

In one embodiment, the screw fastener 112 is composed of a rigid material, such as a metal, for example stainless steel, and the block 106 is composed of a weaker material than that of the screw fastener 112, such as a plastic material, for example teflon. In such an embodiment, when a tensile force of more than approximately 250 pounds is applied to the handle 100, the threads of the screw fastener 112 break through the internally threaded opening 114 of the block 106. Thus, the handle 100 disengages from the bifold door assembly 10 and provides no assistance to gaining a forceful entry to the flightdeck or cockpit side 30 of the bifold door assembly 10.

In another embodiment, the block 106 is composed of a weaker metal material than that of the screw fastener 112, such as aluminum. In this embodiment, the helicoil 118 may be composed of the same or a similar material as the fastener 112, for example, the helicoil 118 may be composed of stainless steel. In such an embodiment, when a tensile force in the range of approximately 250 to approximately 800 pounds is applied to the handle 100, the threads of the helicoil 118 break through the internally threaded opening 114 of the block 106. Thus, the handle 100 disengages from the bifold door assembly 10 and provides no assistance to gaining a forceful entry to the flightdeck or cockpit side 30 of the bifold door assembly 10.

Although the handle 100 and the mounting spud 110 are shown as being connected to the electronically interfacing slam latch assembly 9, the handle 100 and the mounting spud 110 may alternatively be attached to the mechanical deadbolt latch assembly 11, or to either of the doors 12 or 14 of the bifold door assembly 10.

In addition although, the above description has described a bifold door assembly 10 as comprising the electronically interfacing slam latch assembly 9 and the mechanical deadbolt latch assembly 11, it is possible for the bifold door assembly 10 to include the mechanical deadbolt latch assembly 11, and not include the electronically interfacing slam latch assembly 9.

The preceding description has been presented with reference to presently preferred embodiments of the invention. Persons skilled in the art and technology to which this invention pertains will appreciate that alterations and changes in the described structures and methods of operation can be practiced without meaningfully departing from the principle, spirit and scope of this invention. Accordingly, the foregoing description should not be read as pertaining only to the precise structures described and shown in the accompanying drawings, but rather should be read as consistent with and as support for the following claims, which are to have their fullest and fairest scope.

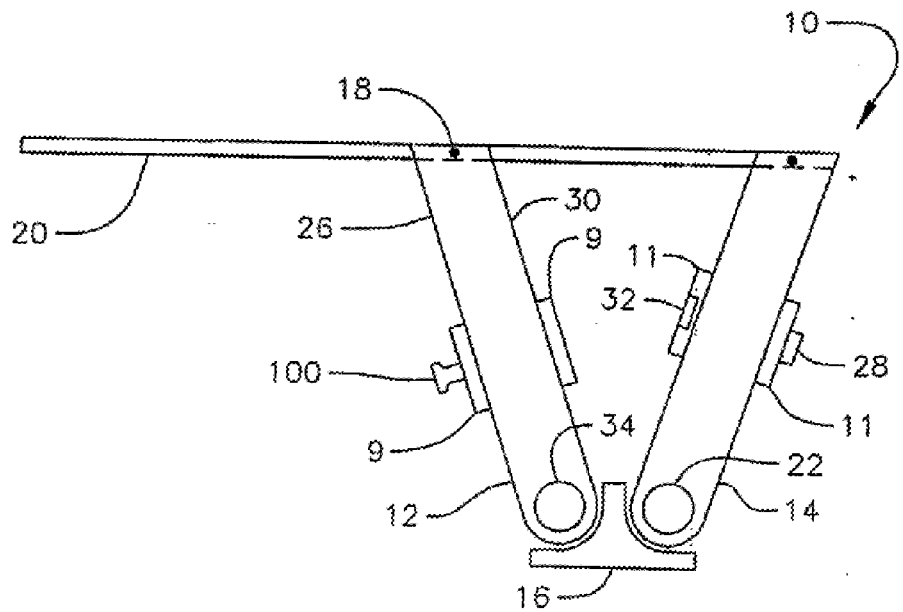

The invention claimed is:

1. A latch assembly for a bifold door assembly comprising:
   a deadbolt rod assembly;
   a first lock actuating means for moving the latch assembly between an unlocked position, wherein the deadbolt rod assembly is in a retracted position and a locked position, wherein the deadbolt rod assembly is in an extended position; and
   a second lock actuating means for moving the latch assembly between the unlocked position, the locked position, and a lockout position wherein the deadbolt rod assembly is extended but cannot be retracted by the first lock actuating means;
   wherein a slide assembly is connected to the deadbolt rod assembly for moving the deadbolt rod assembly between the retracted and extended positions, the slide assembly having a slot and a slide bolt that is moveable both with the slide assembly and within the slide assembly slot;
   wherein when the latch assembly is in either the unlocked or the locked position, actuation of the first lock actuating means causes the first lock actuating means to contact and move the slide bolt, which through the slide assembly causes a corresponding movement of the deadbolt rod assembly, and wherein when the latch assembly is in the lockout position, the slide bolt is retracted within the slide assembly slot in a direction away from the first lock actuating means such that the first lock actuating means does not contact the slide bolt during actuation of the first lock actuating means and therefore actuation of the first lock actuating means does not cause a movement of the deadbolt rod assembly;

wherein the first lock actuating means is a rotatably key cylinder; and wherein the key cylinder is attached to a lock cam, such that rotation of the key cylinder causes a corresponding rotation of the lock cam, the lock cam having first and second arms, wherein when the latch assembly is in the unlocked position, a rotation of the key cylinder in a locking direction causes the first arm to contact and move the slide bolt, which in turn moves the slide assembly and thus the deadbolt rod assembly, and when the latch assembly is in the locked position, a rotation of the key cylinder in an unlocking direction causes the second arm to contact and move the slide bolt, which in turn moves the slide assembly and thus the deadbolt rod assembly.

2. The latch assembly of claim 1, wherein the second lock actuating means is a toggle plate.

3. The latch assembly of claim 2, wherein the toggle plate is connected to the slide assembly through an actuating pin that is connected to the slide bolt and is received by a groove in the toggle plate and a groove in a cover plate, the cover plate being positioned adjacent to the slide assembly.

4. The latch assembly of claim 3, wherein the groove in the toggle plate is an angled groove and the groove in the cover plate is an L-shaped groove.

5. The latch assembly of claim 4, wherein when the latch assembly is moved between the locked and lockout positions, the L-shaped groove prevents a lateral movement of the slide bolt and thus allows the actuating pin to move along the angled groove of the toggle plate, causing a vertical movement of the slide bolt, wherein the slide bolt is engageable by the first lock actuating means in the locked position and not engageable by the first lock actuating means in the lockout position.

6. A bifold door assembly comprising:

a first and a second door connected through a hinge, wherein the doors are attached to a door jam such that the bifold door assembly is moveable between an open position and a closed position;

a latch assembly attached to one of the doors and having:

a deadbolt rod assembly having an extended position, wherein the deadbolt rod assembly engages an opening in the door jam and a retracted position, wherein the deadbolt rod assembly does not engage the opening in the door jam, a first lock actuating means for moving the latch assembly between an unlocked position, wherein the deadbolt rod assembly is in the retracted position and a locked position, wherein the deadbolt rod assembly is in the extended position, and a second lock actuating means for moving the latch assembly between the unlocked position, the locked position, and a lockout position wherein the deadbolt rod assembly is extended but cannot be retracted by the first lock actuating means; and a handle attached to one of the doors, wherein when a tensile force is applied to the handle in a direction away from the bifold door assembly, the handle disengages from the bifold door assembly before damage occurs to the doors or the latch assembly, wherein the handle comprises an opening having a shoulder, with a block having an internally threaded opening disposed within the handle opening and a retaining ring fitted onto the shoulder to retain the handle block within the handle opening.

7. The bifold door assembly of claim 6, further comprising a handle attached to one of the doors, wherein when a tensile force in the range of approximately 250 to approximately 800 pounds is applied to the handle in a direction away from the bifold door assembly, the handle disengages from the bifold door assembly.

8. The bifold door assembly of claim 6, further comprising a handle plate disposed on an opposite side of the bifold door assembly with respect to the handle and having a screw that is attached to the internally threaded opening in the handle block to attach the handle plate to the handle.

9. The bifold door assembly of claim 8, wherein the screw is comprised of a first material and the handle block is comprised of a second material, wherein the first material is stronger than the second material.

10. The bifold door assembly of claim 8, wherein the screw is comprised of stainless steel and the handle block is comprised of teflon.

11. The bifold door assembly of claim 6, wherein an slide assembly is connected to the deadbolt rod assembly for moving the deadbolt rod assembly between the retracted and extended positions, the slide assembly having slot and a slide bolt that is moveable both with the slide assembly and within the slide assembly slot.

12. The bifold door assembly of claim 11, wherein when the latch assembly is in either the unlocked or the locked position, actuation of the first lock actuating means causes the first lock actuating means to contact and move the slide bolt, which through the slide assembly causes a corresponding movement of the deadbolt rod assembly, and wherein when the latch assembly is in the lockout position, the slide bolt is retracted within the slide assembly slot in a direction away from the first lock actuating means such that the first lock actuating means does not contact the slide bolt during actuation of the first lock actuating means and therefore actuation of the first lock actuating means does not cause a movement of the deadbolt rod assembly.

13. The bifold door assembly of claim 12, wherein the second lock actuating means is a toggle plate.

14. The bifold door assembly of claim 13, wherein the toggle plate is connected to the slide assembly through an actuating pin that is connected to the slide bolt and is received by a groove in the toggle plate and a groove in a cover plate, the cover plate being positioned adjacent to the slide assembly.

15. The bifold door assembly of claim 14, wherein the groove in the toggle plate is an angled groove and the groove in the cover plate is an L-shaped groove.

16. The bifold door assembly of claim 15, wherein when the latch assembly is moved between the locked and lockout positions, the L-shaped groove prevents a lateral movement of the slide bolt and thus allows the actuating pin to move along the angled groove of the toggle plate, causing a vertical movement of the slide bolt, wherein the slide bolt is engageable by the first lock actuating means in the locked position and not engageable by the first lock actuating means in the lockout position.

17. The bifold door assembly of claim 12, wherein the first lock actuating means is a rotatably key cylinder.

18. The bifold door assembly of claim 17, wherein the key cylinder is attached to a lock cam, such that rotation of the key cylinder causes a corresponding rotation of the lock cam, the lock cam having first and second arms, wherein when the latch assembly is in the unlocked position, a rotation of the key cylinder in a locking direction causes the first arm to contact and move the slide bolt and thus the deadbolt rod assembly, and when the latch assembly is in the locked position, a rotation of the key cylinder in an unlocking direction causes the second arm to contact and move the slide bolt and thus the deadbolt rod assembly.

19. The bifold door assembly of claim 6, wherein the door jam is attached to an airplane cockpit, such that the bifold door assembly separates an airplane cockpit from an airplane cabin.

20. A bifold door assembly comprising:
   a first and a second door connected through a hinge, wherein the doors are attached to a door jam such that the bifold door assembly is moveable between an open position and a closed position;
   a latch assembly attached to one of the doors and having:
      a deadbolt rod assembly having an extended position, wherein the deadbolt rod assembly engages an opening in the door jam and a retracted position, wherein the deadbolt rod assembly does not engage the opening in the door jam,
      a first lock actuating means for moving the latch assembly between an unlocked position, wherein the deadbolt rod assembly is in the retracted position and a locked position, wherein the deadbolt rod assembly is in the extended position, and
      a second lock actuating means for moving the latch assembly between the unlocked position, the locked position, and a lockout position wherein the deadbolt rod assembly is extended but cannot be retracted by the first lock actuating means,
   wherein a slide assembly is connected to the deadbolt rod assembly for moving the deadbolt rod assembly between the retracted and extended positions, the slide assembly having slot and a slide bolt that is moveable both with the slide assembly and within the slide assembly slot,
   wherein when the latch assembly is in either the unlocked or the locked position, actuation of the first lock actuating means causes the first lock actuating means to contact and move the slide bolt, which through the slide assembly causes a corresponding movement of the deadbolt rod assembly, and wherein when the latch assembly is in the lockout position, the slide bolt is retracted within the slide assembly slot in a direction away from the first lock actuating means such that the first lock actuating means does not contact the slide bolt during actuation of the first lock actuating means and therefore actuation of the first lock actuating means does not cause a movement of the deadbolt rod assembly, and
   wherein the key cylinder is attached to a lock cam, such that rotation of the key cylinder causes a corresponding rotation of the lock cam, the lock cam having first and second arms, wherein when the latch assembly is in the unlocked position, a rotation of the key cylinder in a locking direction causes the first arm to contact and move the slide bolt and thus the deadbolt rod assembly, and when the latch assembly is in the locked position, a rotation of the key cylinder in an unlocking direction causes the second arm to contact and move the slide bolt and thus the deadbolt rod assembly.

* * * * *

UNITED STATES PATENT AND TRADEMARK OFFICE
CERTIFICATE OF CORRECTION

PATENT NO.         : 7,051,780 B2
APPLICATION NO. : 10/397916
DATED                 : May 30, 2006
INVENTOR(S)       : Csik et al.

It is certified that error appears in the above-identified patent and that said Letters Patent is hereby corrected as shown below:

In the Drawings

FIG. 1A, Sheet 1 of 11 — Delete Drawing Sheet 1 and substitute therefore the Drawing Sheet, consisting of Figs. 1A & 1B, as shown on the attached page FIG. 8, Sheet 11 of 11 — Delete Drawing Sheet 11 and substitute therefore the Drawing Sheet, consisting of Fig. 8, as shown on the attached page Delete Title page illustrating figure, and substitute therefor, new Title page illustrating figure. (attached)

In the Claims

Column 9, line 4, Claim 1 — Delete "rotatably", Insert --rotatable--

Column 9, line 40, Claim 6 — Delete "jam", Insert --jamb--

Column 9, line 46, Claim 6 — Delete "jam", Insert --jamb--

Column 9, line 48, Claim 6 — Delete "jam", Insert --jamb--

Column 10, line 22, Claim 11 — Delete "an slide", Insert --a slide--

Column.10 line 62, Claim 17 — Delete "rotatably", Insert --rotatable--

Column 11, line 8, Claim 19 — Delete "jam", Insert --jamb--

Column 11, line 13, Claim 20 — Delete "jam", Insert --jamb--

UNITED STATES PATENT AND TRADEMARK OFFICE
CERTIFICATE OF CORRECTION

PATENT NO. : 7,051,780 B2
APPLICATION NO. : 10/397916
DATED : May 30, 2006
INVENTOR(S) : Csik et al.

It is certified that error appears in the above-identified patent and that said Letters Patent is hereby corrected as shown below:

Column 11, line 19, Claim 20    Delete "jam",
                                 Insert --jamb--

Column 11, line 21, Claim 20    Delete "jam",
                                 Insert --jamb--

Signed and Sealed this

Twenty-first Day of November, 2006

JON W. DUDAS
*Director of the United States Patent and Trademark Office*

(12) United States Patent
Csik et al.

(10) Patent No.: US 7,051,780 B2
(45) Date of Patent: May 30, 2006

(54) LATCH ASSEMBLY FOR A BIFOLD COCKPIT DOOR

(75) Inventors: Stephen C. Csik, Monrovia, CA (US); James R. Hernandez, Pomona, CA (US)

(73) Assignee: Skylock Industries, Inc., Monrovia, CA (US)

(*) Notice: Subject to any disclaimer, the term of this patent is extended or adjusted under 35 U.S.C. 154(b) by 333 days.

(21) Appl. No.: 10/397,916

(22) Filed: Mar. 26, 2003

(65) Prior Publication Data
US 2003/0184097 A1    Oct. 2, 2003

Related U.S. Application Data

(60) Provisional application No. 60/369,098, filed on Mar. 29, 2002.

(51) Int. Cl.
*E05D 15/26* (2006.01)
(52) U.S. Cl. ............... 160/286; 70/218; 70/472; 70/379 R; 16/413; 16/422
(58) Field of Classification Search ........... 160/206, 160/199; 16/422, 412, 413; 70/472, 218, 70/379 R, DIG. 65; 244/118.5, 129.5; 292/34, 292/37, 164, 170, 140
See application file for complete search history.

(56) References Cited

U.S. PATENT DOCUMENTS

| | | | | | |
|---|---|---|---|---|---|
| 1,125,791 | A | * | 1/1915 | Aston | 70/134 |
| 2,237,289 | A | * | 4/1941 | Buck et al. | 16/422 |
| 2,969,666 | A | * | 1/1961 | Muessel | 70/116 |
| 3,390,557 | A | * | 7/1968 | Erickson et al. | 70/97 |
| 4,459,835 | A | * | 7/1984 | Hurskainen | 70/486 |
| 5,096,237 | A | * | 3/1992 | Hotzl | 292/34 |
| 5,435,372 | A | * | 7/1995 | Kikuchi | 160/206 |
| 5,524,941 | A | * | 6/1996 | Fleming | 292/34 |
| 6,834,520 | B1 | * | 12/2004 | LaConte et al. | 70/472 |

* cited by examiner

*Primary Examiner*—David Purol
(74) *Attorney, Agent, or Firm*—Christie, Parker & Hale, LLP

(57) ABSTRACT

A latch assembly is provided having a deadbolt rod assembly, and a first lock actuating means for moving the latch assembly between an unlocked position, wherein the deadbolt rod assembly is in a retracted position and a locked position, wherein the deadbolt rod assembly is in an extended position. The latch assembly further includes a second lock actuating means for moving the latch assembly between the unlocked position, the locked position, and a lockout position wherein the deadbolt rod assembly is extended but cannot be retracted by the first lock actuating means.

20 Claims, 11 Drawing Sheets